April 7, 1936. C. H. KIRBY Re. 19,916

CARBURETOR

Original Filed April 23, 1932 7 Sheets-Sheet 1

Inventor
Charles H. Kirby.
Charles W. Ellis
Atty.

April 7, 1936. C. H. KIRBY Re. 19,916
CARBURETOR
Original Filed April 23, 1932 7 Sheets-Sheet 2
FIG. 2
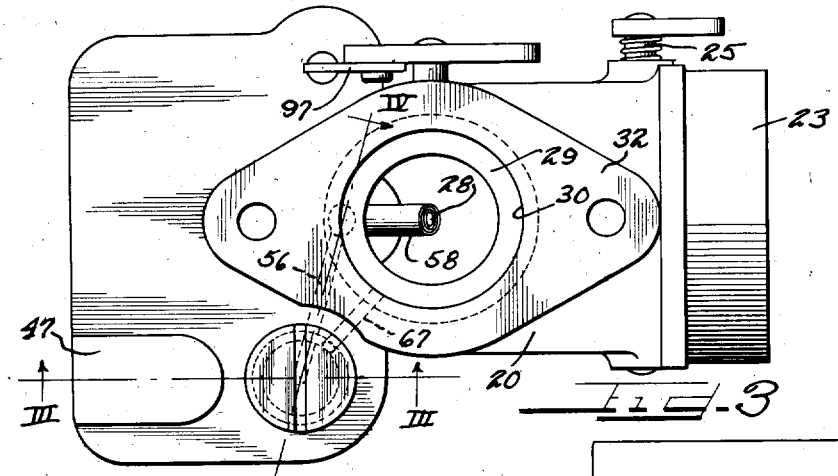
FIG. 3
FIG. 4
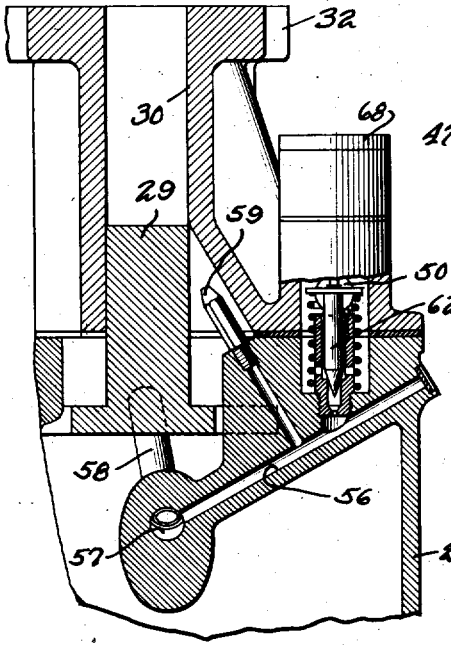
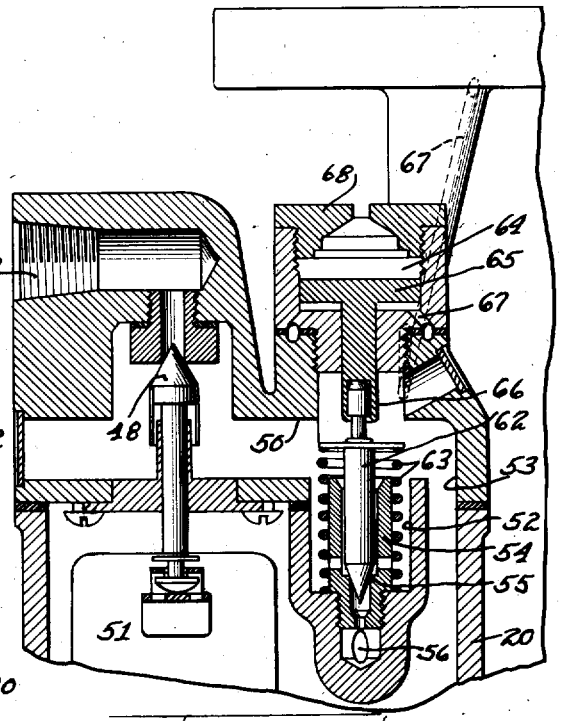
INVENTOR
Charles H. Kirby.
BY Charles Allen ATTY.

April 7, 1936. C. H. KIRBY Re. 19,916
CARBURETOR
Original Filed April 23, 1932 7 Sheets-Sheet 3
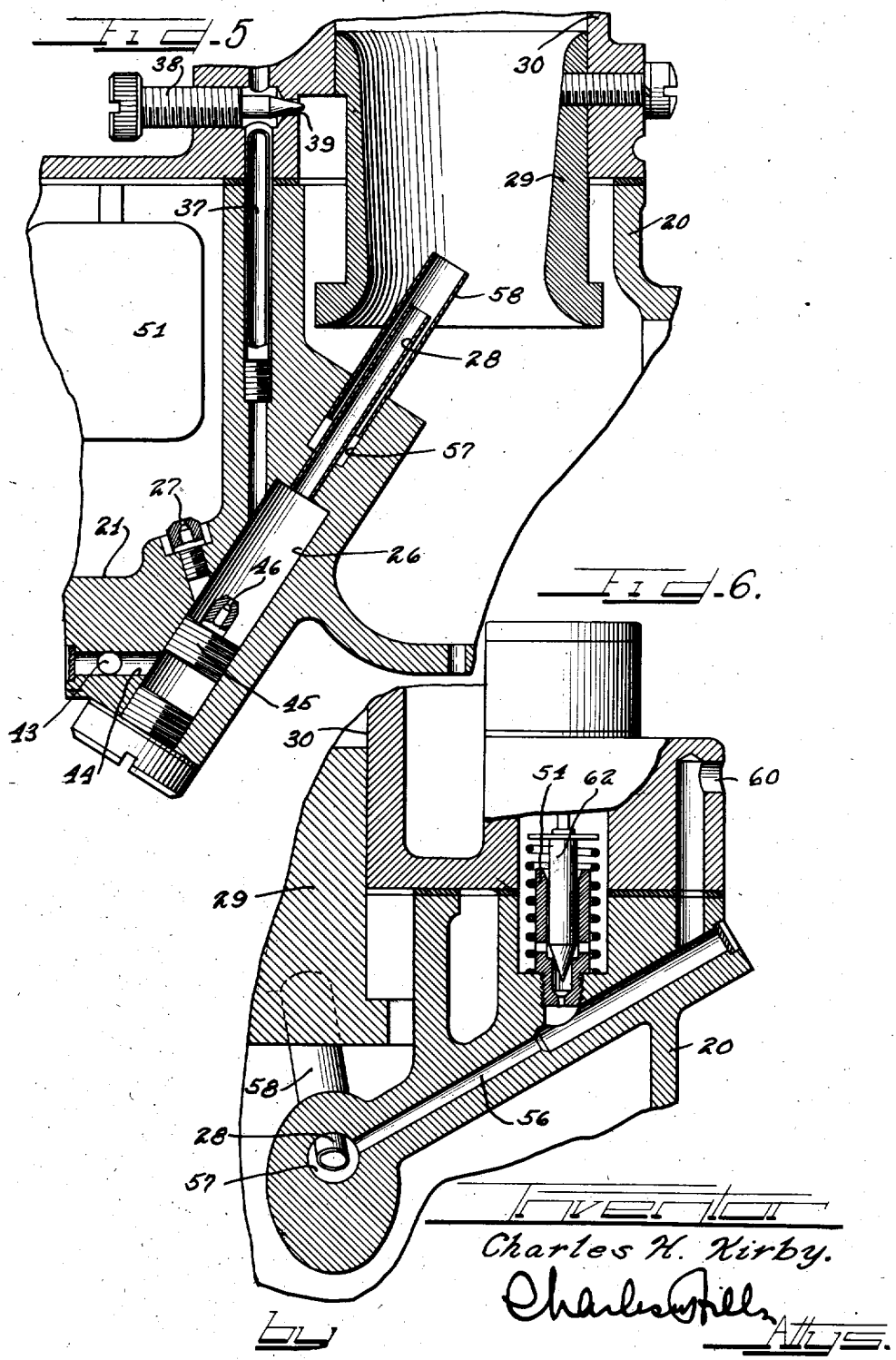

CARBURETOR

Original Filed April 23, 1932 7 Sheets-Sheet 4

Inventor

Charles H. Kirby.

Charles Miller

Atty.

April 7, 1936. C. H. KIRBY Re. 19,916

CARBURETOR

Original Filed April 23, 1932 7 Sheets-Sheet 5

Inventor
Charles H. Kirby.
Charles Stell
Attys.

April 7, 1936. C. H. KIRBY Re. 19,916

CARBURETOR

Original Filed April 23, 1932 7 Sheets-Sheet 6

Inventor
Charles H. Kirby.
by Charles Fellows Atty.

April 7, 1936. C. H. KIRBY Re. 19,916

CARBURETOR

Original Filed April 23, 1932 7 Sheets-Sheet 7

Inventor
Charles H. Kirby.
Charles Neill
Atty.

by

Reissued Apr. 7, 1936

Re. 19,916

UNITED STATES PATENT OFFICE 19,916

CARBURETOR

Charles H. Kirby, Flint, Mich., assignor to Marvel Carbureter Company, Flint, Mich., a corporation of Illinois Original No. 1,931,259, dated October 17, 1933, Serial No. 607,053, April 23, 1932. Application for reissue September 21, 1935, Serial No. 41,630

11 Claims. (Cl. 261—41)

This invention relates to carburetors for internal combustion engines and has special reference to a carburetor having improved metering characteristics in the upper part of the power range.

It is well known in the art that it is difficult to combine satisfactory idling and maximum power characteristics in a plain tube carburetor with a single venturi since if the venturi is large enough for maximum power it will be difficult to provide sufficient suction at the fuel nozzle outlet to lift the required amount of fuel to maintain a proper mixture ratio at extreme low engine speeds, and, with the same setting, avoid undue mixture richness at some points above the extreme low engine speeds. Several solutions of this problem have been attempted, such as concentric venturis and various attempts at metering the fuel over the economy range, and it is accordingly an important object of this invention to provide an improved carburetor wherein the metering characteristics have been adjusted to more perfectly suit the engine requirements over a wide operating range. I accomplish this improved result by providing a relatively unrestricted venturi in a plain tube carburetor and provide substantially separate fuel metering supplies thereto one of which is the usual form of suction actuated delivery metered by submerged calibrated orifices or jets. Since this form of fuel delivery has the faults previously mentioned I provide a substantially separate secondary fuel supply embodying an overflowing or pressure head at the nozzle delivery point this secondary fuel supply being mechanically controlled in accordance with the engine operating conditions as by the engine suction as distinguished from the suction within the carburetor adjacent the fuel discharge nozzle. Thus one fuel supply supplements the other since the overflowing nozzle can be arranged for either constant delivery or variable delivery in response to suction thereon, according to the arrangement of the air bleed therein into. One form of my invention has been shown in connection with an anterior throttle type of carburetor wherein the carburetor nozzles are subjected to manifold suction which as is well known varies from a maximum at idling to a minimum at wide open throttle and slow operating speeds. With this arrangement it is necessary to modify the suction on the primary nozzle system since maximum suction coincides with minimum fuel requirements, when the secondary fuel system has been shut off.

Plain tube carburetors with suction actuated fuel feeds, even if provided with a compensating fuel system, depend for fuel delivery upon suction within the carburetor and lag in delivery due to the height the fuel must be lifted as well as the surface tension of the liquid fuel. A positive head on the fuel delivery is ideal for normal operating conditions but supplies an overrich mixture under conditions of low demand, and a lean mixture at the other end of the scale where a slightly overrich mixture will produce the maximum power of the engine. I overcome these drawbacks by providing a primary fuel system responsive to suction thereon and supplement this with a gravity flow fuel system which compensates for the leanness of the suction responsive nozzle at part load and is itself restricted at higher loads by an air bleed adjusted to engine requirements, since under such conditions the suction controlled nozzle is capable of supplying a greater proportion of the fuel needed to maintain proper mixture proportions for maximum performance. It is accordingly an object of this invention to provide an improved carburetion system which combines two divergent fuel supply systems in such a way as to balance each by the other to obtain a greatly increased range of performance maintained at the maximum economy consistent with operating requirements.

It is a further object of this invention to provide an improved plain tube carburetor capable of developing the maximum power output of a given engine while maintaining desirable part load operating conditions. I accomplish this result by providing a plain tube carburetor, having a suction controlled primary nozzle system, with a secondary nozzle system supplied with fuel under a positive or static head above the nozzle outlet, fuel being supplied in excess quantities to a well feeding the secondary nozzle system and overflowing from the well into a lower fuel bowl containing the usual float operated fuel inlet valve controlling the fuel supply to the well.

It is a further object of this invention to provide an improved fuel supply system involving a static or pressure head wherein the fuel flow is under the control of a valve adapted to shut off in response to idling conditions such as high manifold suction or a closed throttle.

It is also an object of this invention to provide an improved and simplified carburetor of superior automatic metering characteristics not subject to derangement or maladjustment in service.

Other and further important objects of this invention will be apparent from the disclosures in the specification and the accompanying drawings.

This invention (in a preferred form) is illustrated in the drawings and hereinafter more fully described.

On the drawings:

Figure 2 is a reduced plan view of the carburetor shown in Figure 1.

Figure 3 is a fragmentary section on the line III—III of Figure 2.

Figure 4 is a fragmentary section on the line IV—IV of Figure 2.

Figure 5 is a fragmentary section of a carburetor similar to that of Figure 1 embodying a modified form of nozzle structure.

Figure 6 is a fragmentary section similar to Figure 4 embodying a modification in the air bleed arrangement.

As shown on the drawings:

Figure 1:
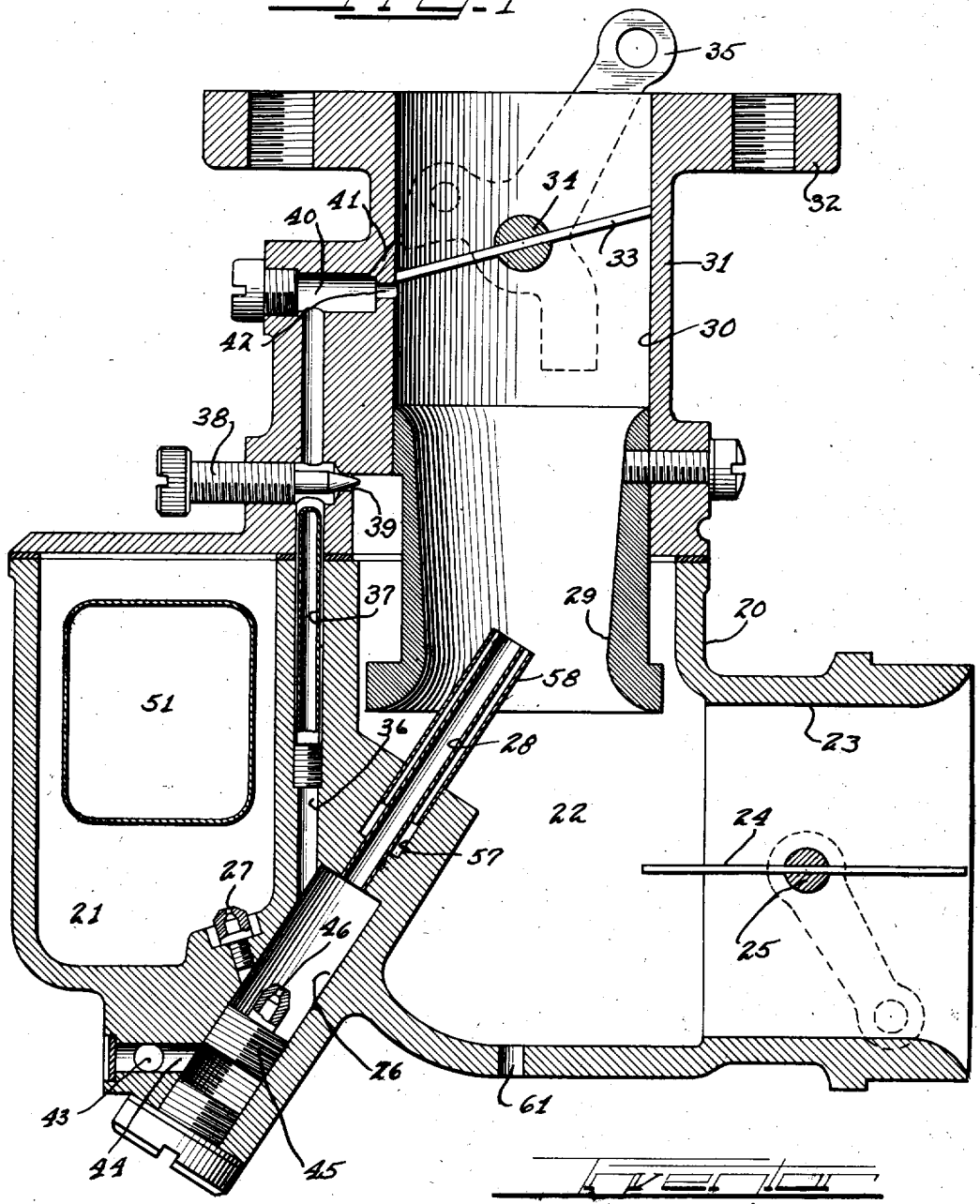
Figure 1 is a vertical section through an updraft carburetor embodying the features of this invention.
Figure 7:
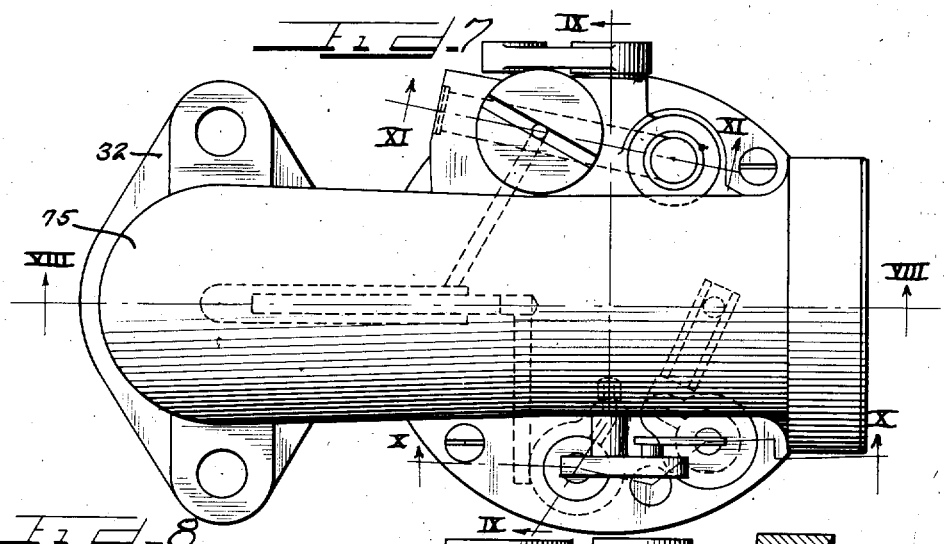
Figure 7 is a plan view of a downdraft carburetor embodying the features of this invention.
Figure 8:
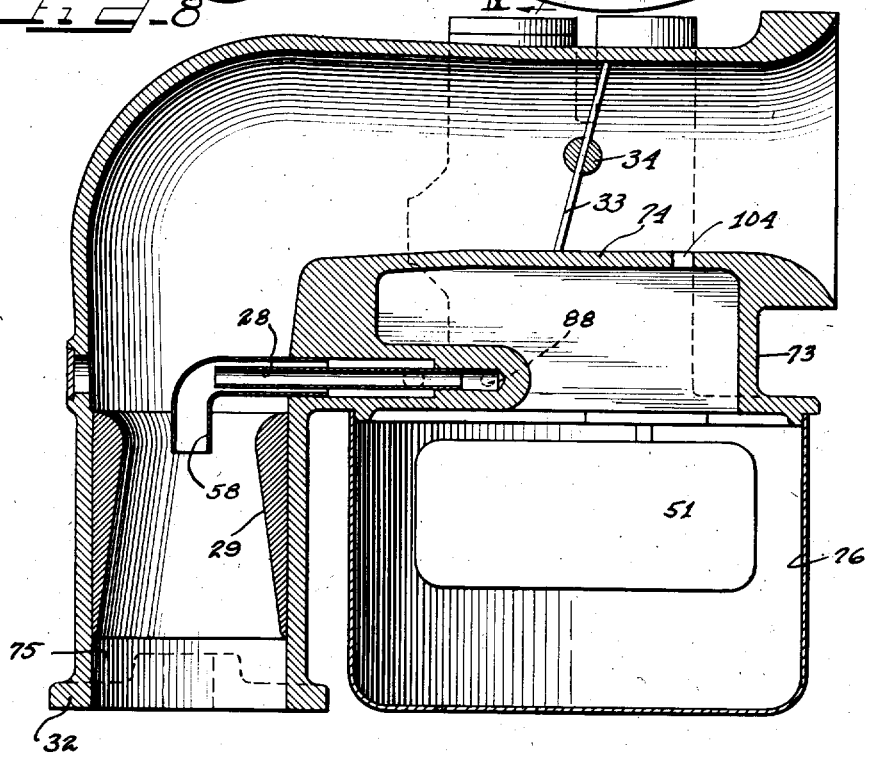
Figure 8 is a section on the line VIII—VIII of Figure 7.

The updraft type of carburetor illustrated in Figures 1 to 6 comprises a body member 20 containing a fuel chamber 21, and a mixing chamber 22 with an elbow air inlet 23 thereto controlled by a choke valve 24 on a shaft 25. The fuel chamber 21 feeds into a passage 26 through a calibrated metering jet 27, the passage 26 having a tube 28 forming a discharge nozzle subject to the suction at the throat of a venturi 29 mounted in a mixture outlet passage 30 in a cover member 31, the outlet passage terminating in the usual mounting flange 32, and containing the butterfly throttle valve 33 on a shaft 34 operated by a lever 35.

An idling mixture passage 36 contains a calibrated metering jet 37 and leads from the passage 26 up to an idling adjustment needle valve 38 controlling the admixture of air from the mixing chamber 22 through a port 39. The idling passage 36 terminates in a chamber 40 adjacent the edge of the throttle valve when the latter is closed, passages 41 and 42 leading from the chamber 40 to above and below the edge of the throttle valve as shown in Figure 1. With this construction the high suction above the throttle under idling conditions serves to draw fuel through the jet 37 and air through the port 39 as well as air from below the edge of the throttle through the passage 42, control of the idling mixture proportions, after the jet 37 has been selected, residing in the idling adjusting needle valve 38 which controls the admission of air below the chamber 40.

The carburetor is provided with a throttle operated accelerating pump to be described in connection with that embodiment of the invention disclosed in Figures 7 to 12, the pump delivering through passages 43 and 44 shown in Figure 1 as opening into the chamber 26 below a plug 45 therein which contains a calibrated metering jet 46.

The foregoing described structure is a more or less simple form of carburetor which differs from the conventional plain tube carburetor of this type in that the venturi is relatively large and unrestricted so that maximum power may be obtained. The venturi is in fact so large as to be inadequate to create sufficient suction on the fuel nozzle at normal part load operating conditions so that the carburetor as so far described would be entirely unsuitable for other than idling and full load operation at high engine speeds; the intermediate range and the finer mixture control therefore being cared for by a secondary fuel nozzle system to be presently described.

The secondary or pressure fuel supply is best shown in Figure 3 wherein it is combined with the fuel admission to the carburetor. Fuel is supplied in any convenient manner to an inlet passage 47 formed in a boss 48 on the cover and is admitted past a float controlled valve 49 to a chamber 50 in the cover. The float 51 and float valve 49 are so arranged that there is no direct flow from the chamber 50 to the float chamber 21, the fuel flowing into a well 52 and overflowing therefrom through a passage 53 leading to the float chamber. Thus the well is maintained full of fuel to a level above that of the float chamber and also considerably above the outlet of the primary nozzle tube 28. The well 52 contains a valve guide member 54 having a valve seat 55 discharging into a passage 56 leading to an annular chamber 57 surrounding the primary nozzle tube 28, an enveloping tube 58 forming the secondary nozzle and terminating considerably below the level of the fuel in the well 52 so that an appreciable pressure or static head of fuel causes discharge through the nozzle as long as the passages thereto are open.

This pressure or static head is supplemented by suction on the nozzle outlet at high rates of air flow through the venturi such as occur in the power range and in order to control the suction effect on the nozzle tube 58 it is desirable to air bleed the same. Figures 4 and 6 show two air bleeding arrangements which may be selected to control the fuel delivery in accordance with the requirements of a given engine design. In Figure 4 by providing a calibrated orifice 59 admitting air from the mixing chamber 22 to the passage 56 the variable suction in the mixing chamber as well as the restricted orifice 59 will serve to vary the fuel feed per unit of time in accordance with variations in operating conditions. On the other hand an unrestricted atmospheric vent 60 to the passage 56, located above the level of the fuel in the well 52, as shown in Figure 6, will serve to give a constant rate of fuel flow regardless of suction conditions within the carburetor. The air bleed of Figure 4 can be so chosen as to vary the fuel flow in step with engine requirements over and above the supply due to suction on the primary or suction nozzle 28, so that varying engine requirements can be predetermined and allowed for without the further need of field adjustments subject to the manifold idiosyncrasies of individual operations or service men.

Since the nozzle tube 58 is below the level of the fuel in the well 52 the fuel naturally tends to overflow to the bottom of the mixing chamber 22 upon stoppage of the engine. A drain hole 61 may be provided, but if there is any objection to such overflow the inner or primary nozzle tube 28 may be made shorter than the outer tube as shown in Figure 5, in which case the fuel in the outer nozzle 58 flows back through the inner nozzle 28 to the chamber 26 and thence to the float bowl 21 through the jet 27, raising the float 51 until the float valve 48 cuts off further admission of fuel.

The fuel flow past the valve seat 55 is under the control of a valve 62 normally held away from the seat by a spring 63. This valve is provided primarily as a shut off valve when the engine is operating under idling conditions and the preferred method of control thereof is shown in Figure 3 where a vacuum chamber 64 contains a piston 65 reciprocable therein which is provided with a stem 66 engaging the head of the valve 62. A suction passage 67 connects the lower part of the chamber 64 with the carburetor outlet passage 30 above the throttle therein, so that the piston is drawn downwardly by high suction on the engine side of the throttle valve. Since the maximum suction at this point occurs with a closed throttle under idling conditions it will be seen that with a properly chosen spring 63 the valve 62 will be closed under idling conditions when the idling bypass is operative, and that as the throttle is opened the suction acting on the piston will decrease in value until the spring 63 lifts the valve 62. The upper part of the chamber 64 can conveniently be vented through a cap 68 to prevent retardation of the piston movement. The strength of the spring 63 can be predetermined in relationship to the chamber size and manifold vacuum to cause the valve 62 to initially open at any desired point in the operating range above normal idling.

Figure 16:
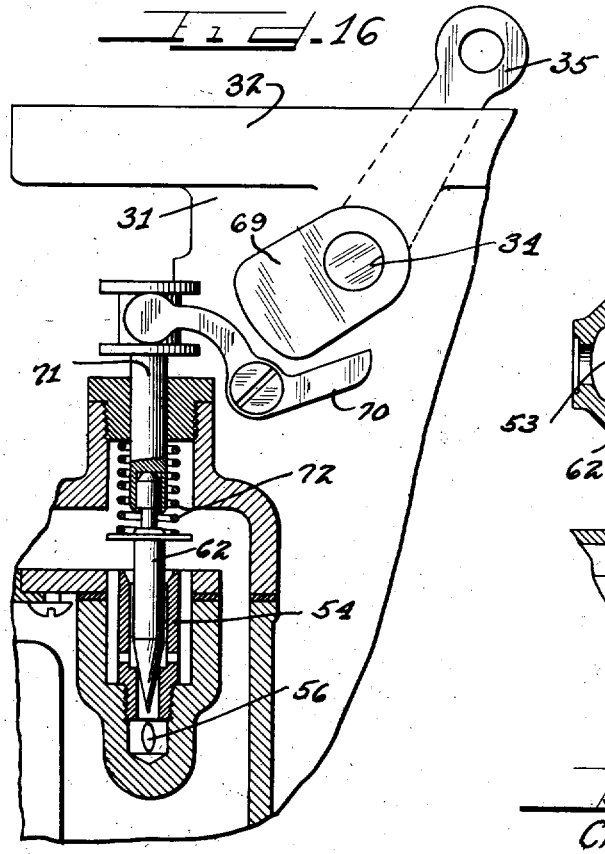
Figure 16 is a fragmentary section of the throttle control of Figure 14 as applied to the carburetor of Figures 1 to 6.

The foregoing suction control of the secondary fuel supply is directly responsive to variations in pressure which cause fluctuations in the delivery from the primary fuel nozzle system and is therefore the preferred form of the invention. However since engine suction is largely determined by the position of the throttle under idling conditions, the control of the valve 62 may be derived directly from the throttle as shown in Figure 16 where a cam 69 has been applied to the throttle shaft 34 and operates through a bell crank 70 to lift the valve 62 when the throttle is opened, by means of a plunger 71, the valve 62 being normally held closed by a spring 72. It will be evident that in this modification the cam can be varied in profile to obtain any desired point and degree of opening relative to throttle movements to secure a supplemental or secondary fuel supply that will compensate for the deficiencies in the rate of fuel supply from the primary or suction operated nozzle 28.

The downdraft type of carburetor illustrated in Figures 7 to 15 has many of the features described in connection with the updraft type previously described, so that for the sake of simplicity the same reference numerals will be used in describing the parts of the downdraft carburetor that are similar in structure and function to those of the first described carburetor.

The downdraft carburetor comprises a body member 73 providing an air inlet passage 74 in which the throttle 33 is mounted, the passage 74 leading to a downwardly discharging outlet passage 75, containing the venturi 29, and terminating in the usual mounting flange 32. Thus the arrangement shown provides an anterior throttle which also replaces the usual choke valve and renders the fuel nozzle outlets subject to manifold or engine suction at all times. Since manifold suction is a maximum under idling conditions it is necessary to limit or shut off the flow of fuel to the primary or suction nozzle tube 28 as well as from the secondary gravity or pressure nozzle 58, the outer end of which is bent downwardly in the direction of the air flow. The end of the suction nozzle tube 28 is cut off inside the outer tube to avoid the syphon effect that might result were it carried down to the outlet of the outer tube.

Fuel is supplied to the primary nozzle system from a float bowl 76 applied beneath the body member 73, the various parts of the primary system being arranged in a boss 77 depending into the bowl from the body member. Compensation for the increased suction under idling conditions is provided by a metering pin 78 carrying a head 79 yieldingly held by a plunger 80 which is adapted to be pressed downwardly by a cam 81 carried by the throttle shaft 34 the cam contacting an adjustable tappet 82 for controlling the location of the metering pin 78 relative to a tapered orifice 83 which admits fuel from the bowl to a chamber 84 in which the plunger operates. The plunger is normally urged upwardly by a spring 85 and is limited in its movement by a set screw 86 engaging in an elongated slot 87 in the plunger. Fuel entering through the orifice 83 is delivered through the passage 88 to the nozzle tube 28. The chamber 84 is also provided with an air bleed passage 89 having a restricted inlet 90 within the bowl above the liquid level therein.

When the throttle valve is fully closed the metering pin 78 closes the orifice 83 and it is therefore desirable to provide a priming mechanism comprising a secondary fuel inlet passage 91 bypassing the orifice 83 and normally closed by a valve 92 held down by a spring 93. By lifting up on the head 94 of the valve 92, by means of any suitable primer operating mechanism, the valve 92 is lifted off its seat and allows the chamber 84 to fill, although fuel is not delivered from the nozzle 28 until engine suction acts thereon.

Figure 10:
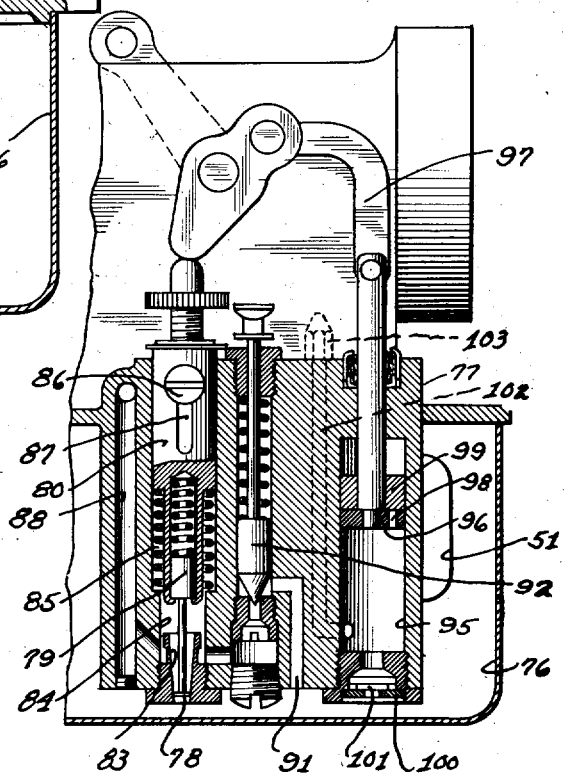
Figure 10 is a section on the line X—X of Figure 7.

The accelerating pump structure shown in Figure 10 is common to both forms of carburetors; comprising a pump cylinder 95 containing a reciprocable piston 96 operatively connected to the throttle cam by a link 97 to be operated by an opening movement of the throttle. The piston is ported at 98 and has a free follower 99 thereabove which serves to give a prolonged accelerating charge since a rapid downward movement of the piston will force fuel through the port 98 thus retarding the downward movement of the follower until the piston stops moving whereupon the follower acts as a second piston to return the escaped fuel to the pumping cylinder below the piston. Fuel is admitted to the cylinder through the plug 100 which contains a check valve 101, fuel being delivered through a passage 102 and nozzle 103 (both shown dotted in Figure 10) to the air inlet passage 74. The nozzle 103 actually does not reach the passage but sprays through an orifice 104 therein which also serves as a vent for the float bowl since it is anterior to the throttle.

Figure 11:
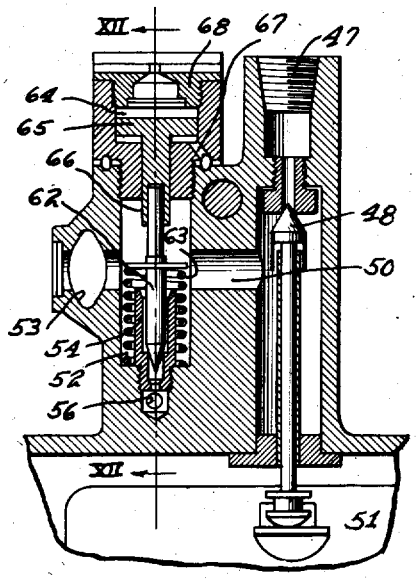
Figure 11 is a section on the line XI—XI of Figure 7.
Figure 13:
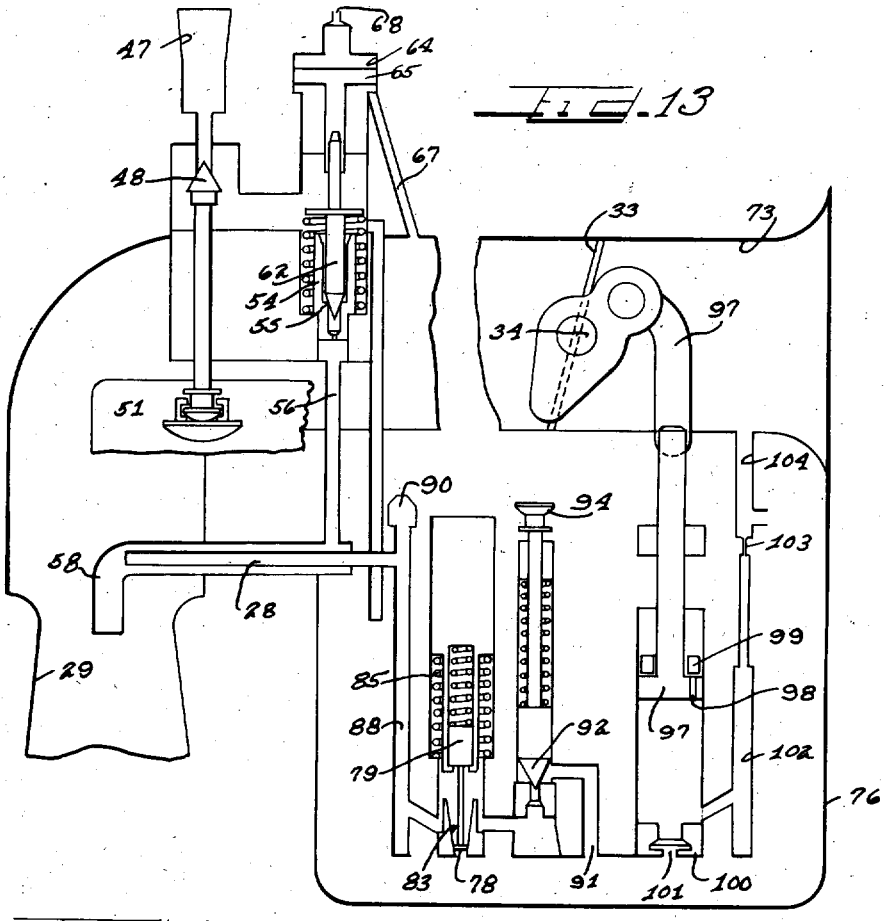
Figure 13 is a diagrammatic assembly of the features of the carburetor shown in Figures 7 to 12.
Figure 12:
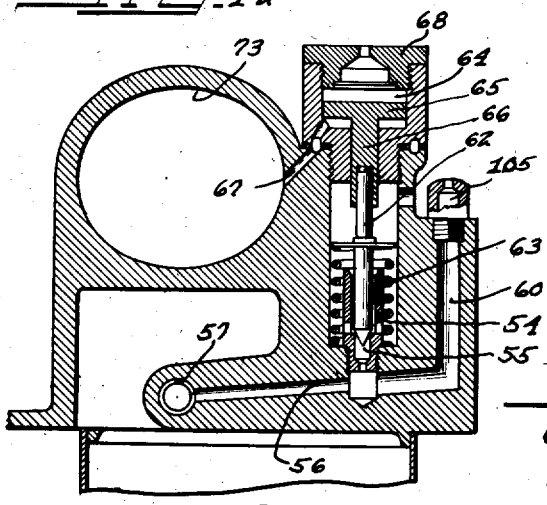
Figure 12 is a section on the line XII—XII of Figure 11.
Figure 14:
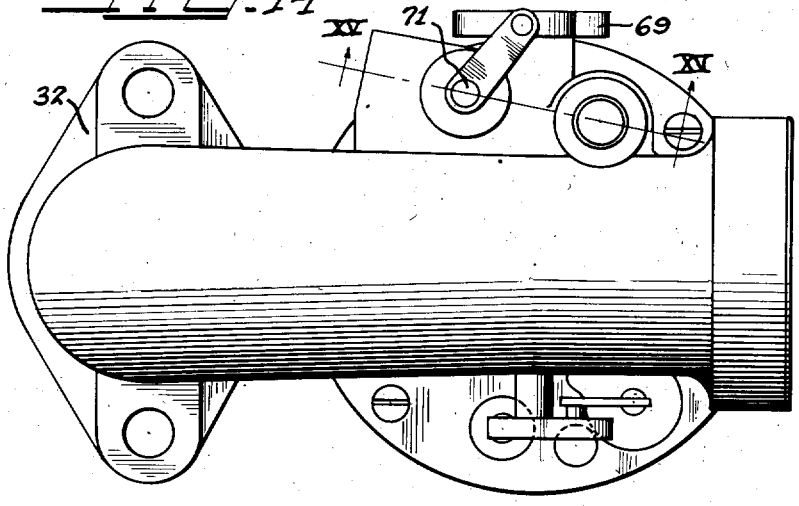
Figure 14 is a plan view of a carburetor similar to that of Figures 7 to 13, wherein a throttle control has been substituted for the suction control of the fuel flow from the gravity nozzle.
Figure 15:
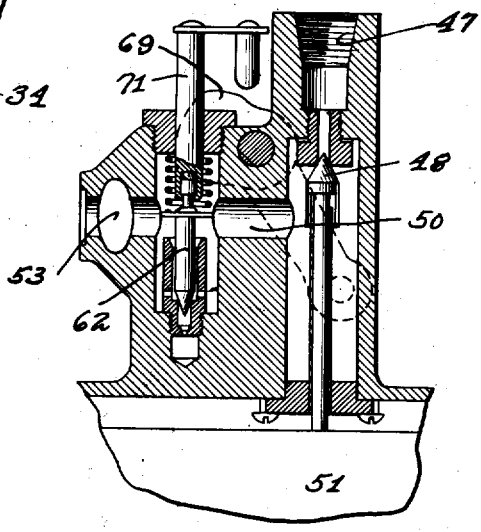
Figure 15 is a section on the line XV—XV of Figure 14.

The secondary fuel system is substantially similar to that described in connection with the first type of carburetor, since as shown in Figures 11 and 12 the float 51 controls the admission of fuel past the valve 48 at the inlet 47 and this fuel flows along the passage 50 to the well 52, excess fuel overflowing from the well to the float chamber through the passage 53. The well feeds fuel past the valve 62 into the passage 56 leading to the outer nozzle tube 58. The previously described types of air bleeds to the passage 56 may be used although only the external bleed 60 has been shown in Figure 12, a restricted orifice 105 being shown in connection therewith. The same variations of valve control, comprising a suction control of the valve 62, as in Figures 11 and 12; and a throttle control as in Figures 14 and 15, are provided, the throttle cam 69 in the latter embodiment serving to directly lift the valve 62 through an offset pin 106 carried by the member 71.

The operation of the carburetor of this invention may conveniently be considered in two stages, since the characteristics of the primary fuel system in some respects are opposed to those of the secondary or gravity fuel system and the two thus complement each other.

The primary or suction controlled fuel system of the updraft carburetor is best shown in Figure 1 wherein the calibrated metering jet 27 limits the fuel delivery to the nozzle tube 28 at high suctions thereon, corresponding to maximum demands with wide open throttle. Since the fuel lift required at the nozzle tube outlet precludes delivery under conditions of a slight pressure drop in the mixing chamber 22 it is usual to provide an idling bypass 36 which is subjected to the high manifold suction created by a nearly closed throttle. When the primary fuel supply comes into action the delivery therefrom increases rapidly as a function of the suction in the mixing chamber, until the capacity of the metering jet 27 is reached. Thereafter the increase is less rapid until it reaches a maximum under full power conditions. The primary fuel system is of course proportioned so that at the maximum the engine requirements are not fully satisfied since the fuel supplied is not a constant proportion of the engine requirements.

The secondary or gravity head fuel supply to the outer nozzle tube 58 would obviously overflow as long as fuel is supplied to the carburetor so that the shut-off valve 62 actuated by either the manifold suction or the closing of the throttle serves to prevent the secondary fuel system from coming into action until the idling bypass supply tapers off due to the initial opening movement of the throttle. Opening of the throttle also decreases the manifold suction differential allowing the suction controlled valve to open thus causing the secondary fuel system to cover the gap left by the falling off of the idling supply. The secondary fuel system delivers a substantially constant fuel flow until suction acts on the nozzle to accelerate this flow. Thereafter, with an increasing demand, this increasing suction brings the primary system into initial and increasing action sufficient to maintain proper and economical mixture proportioning over the intermediate power range of the engine.

The secondary fuel supply can be air bled as previously described to either maintain a constant flow regardless of suction acting on the nozzle, or to respond in varying degrees to suction increases, as required to compensate for the varying proportion of the fuel supply furnished by the primary or suction responsive fuel system. Thus the combination of the two fuel systems can economically cover the full range of operating conditions without localized intervals of over-richness or leanness in the mixture proportioning.

Figure 9:
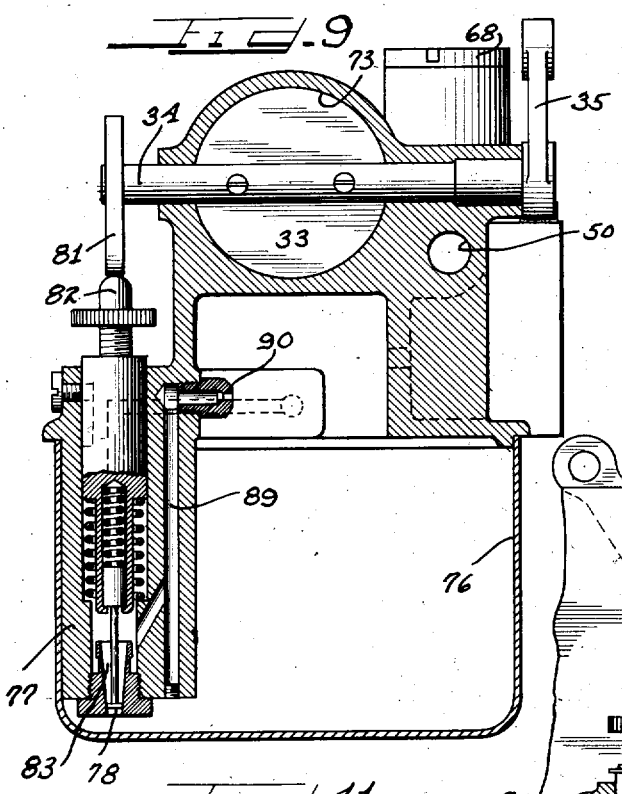
Figure 9 is a section on the line IX—IX of Figure 7.

The anterior throttle type of downdraft carburetor illustrated in Figures 7 to 15 chiefly differs from that previously described, in the control of the primary or suction responsive fuel feed. This is because the anterior location of the throttle imposes manifold suction on the nozzle outlet and the pressure differential causing fuel flow is therefore a maximum under idling conditions and tapers off as the throttle is opened. The metering arrangement of Figures 9 and 10 is therefore provided to cut off the flow of fuel to the primary nozzle when the throttle is closed by means of the cam 81 which pushes the metering pin 78 downwardly in the tapered orifice 83 to stop the flow of fuel. The cam is so formed as to result in prompt partial retraction of the metering pin when the throttle is opened sufficiently for idling thus providing a gradually increasing fuel supply covering idling and the transition interval to part load operation. The chamber 84 is air bled through the passage near the bottom thereof to prevent suction from affecting the metering of fuel through the orifice 83. With this arrangement, the fuel flow through the primary system, after the metering pin reaches its upper position, does not increase as rapidly as in the first described form where the suction on the nozzle increased out of proportion to the increased air flow. The secondary or pressure fuel system operates in the same way as before except that it is desirable to have the delivery respond somewhat to the injector effect on the nozzle at large volumes of air flow, this result being accomplished by restricting the air bleed orifice as indicated at 90 in Figure 12.

It will thus be seen that I have invented an improved and simplified carburetor having greatly improved metering characteristics over an increased operating range giving higher specific power outputs for a given engine without adversely affecting the economical operation thereof at part loads.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A carburetor having in combination a body containing an air intake passage leading to a venturi and a mixture outlet passage therefrom, a throttle valve controlling the flow through said passages, a primary suction responsive fuel supply including a nozzle discharging at the throat of said venturi, a secondary fuel supply also discharging at the throat of said venturi, said secondary fuel supply including means for maintaining a positive static head relative to the point of discharge, and means responsive to suction in the carburetor passages on the engine side of the throttle valve for cutting off said secondary fuel supply in response to high suctions in said passages.

2. A carburetor having in combination a body containing an air intake passage leading to a venturi and a mixture outlet passage therefrom, a throttle valve controlling the flow through said passages, a primary suction responsive fuel supply including a nozzle discharging at the throat of said venturi, a secondary fuel supply also discharging at the throat of said venturi, said secondary fuel supply including means for maintaining a positive static head relative to the point of discharge, and means adapted to shut off said secondary fuel supply under idling conditions.

3. A carburetor of the class described comprising a body member having a suitable air passage therethrough, including a venturi and throttle valve in said passage, primary and secondary fuel metering systems having separate metering and delivery orifices, a well supplying fuel under a gravity head to said secondary fuel metering system, valve means for controlling the fuel delivery from said well, a float chamber supplying fuel to the primary fuel metering system in response to suction thereon, means for supplying excess fuel to said well and for conducting the excess fuel from said well to the float chamber, and a float actuated valve controlling the admission of fuel to the well.

4. A carburetor of the class described comprising a body member having a suitable air passage therethrough, including a venturi and throttle valve in said passage, primary and secondary fuel metering systems having separate metering and delivery orifices, a well supplying fuel under a gravity head to said secondary fuel metering system, means adapted to shut off the secondary fuel metering system under idling conditions, a float chamber supplying fuel to the primary fuel metering system in response to suction thereon, means for supplying excess fuel to said well and for conducting the excess fuel from said well to the float chamber, and a float actuated valve controlling the admission of fuel to the well.

5. A carburetor comprising a well, a fuel supply therefor, a constant level fuel reservoir at a lower level relative to the well, an overflow passage from said well to the reservoir, a nozzle connected to the well and located below the fuel level therein whereby a positive static fuel head is maintained on the fuel delivered from said nozzle, and means for air bleeding the fuel supply to said nozzle to reduce the effect of suction thereon.

6. A carburetor comprising a well, a fuel supply therefor, a constant level fuel reservoir at a lower level relative to the well, an overflow passage from said well to the reservoir, a nozzle connected to the well and located below the fuel level therein whereby a positive static fuel head is maintained on the fuel delivered from said nozzle, means for air bleeding the fuel supply to said nozzle to reduce the effect of suction thereon, and means for cutting off the flow of fuel to said nozzle under idling conditions.

7. A carburetor comprising a well, a fuel supply therefor, a constant level fuel reservoir at a lower level relative to the well, an overflow passage from said well to the reservoir, a nozzle connected to the well and located below the fuel level therein whereby a positive static fuel head is maintained on the fuel delivered from said nozzle, means for air bleeding the fuel supply to said nozzle to reduce the effect of suction thereon, and suction responsive means adapted to cut off the flow of fuel to said nozzle at high engine suctions.

8. A carburetor comprising a well, a fuel supply therefor, a constant level fuel reservoir at a lower level relative to the well, an overflow passage from said well to the reservoir, a nozzle connected to the well and located below the fuel level therein whereby a positive static fuel head is maintained on the fuel delivered from said nozzle, means for air bleeding the fuel supply to said nozzle to reduce the effect of suction thereon, and a second nozzle connected to the fuel reservoir and adapted to draw fuel therefrom in response to suction on said nozzle.

9. A carburetor comprising a well, a fuel supply therefor, a constant level fuel reservoir at a lower level relative to the well, an overflow passage from said well to the reservoir, a nozzle connected to the well and located below the fuel level therein whereby a positive static fuel head is maintained on the fuel delivered from said nozzle, valve means for controlling the fuel delivery from said well, and a second nozzle connected to the fuel reservoir and adapted to draw fuel therefrom in response to suction on said nozzle.

10. In a carburetor having a primary fuel supply system including a float chamber and fuel delivery means, a secondary fuel supply system supplementing the primary fuel supply system, comprising a fuel nozzle, means for supplying fuel to said nozzle under a gravity head, and suction responsive means for coordinating the supply of fuel from said nozzle with that of the primary fuel supply system whereby to provide a balanced fuel and air mixture in the carburetor over the operating range thereof.

11. In a carburetor having a primary fuel supply system including a float chamber and fuel delivery means, a secondary fuel supply system supplementing the primary fuel supply system, comprising a fuel nozzle, means for supplying fuel to said nozzle under a gravity head, and suction actuated means adapted to cut off the secondary fuel supply at a predetermined high suction whereby the secondary fuel supply system supplements the primary fuel supply system at operating conditions above small loads.

CHARLES H. KIRBY.